United States Patent

[11] 3,624,479

| [72] | Inventor | John G. Callas |
| | | Wood-Ridge, N.J. |
| [21] | Appl. No. | 34,037 |
| [22] | Filed | May 4, 1970 |
| [45] | Patented | Nov. 30, 1971 |
| [73] | Assignee | The Bendix Corporation |

[54] FAIL INACTIVE, NONREDUNDANT TIME DELAY MONITOR
11 Claims, 14 Drawing Figs.

[52] U.S. Cl........................................................ 318/565
[51] Int. Cl................................................. G05b 23/02
[50] Field of Search........................................... 318/565

[56] References Cited
UNITED STATES PATENTS
3,406,319  10/1968  Faulkes....................  318/565
3,440,504  4/1969  Boskovich...................  318/565 X
3,454,851  7/1969  Kirchhein...................  318/565
3,523,226  8/1970  Medlinski...................  318/565

Primary Examiner—Benjamin Dobeck
Attorneys—Anthony F. Cuoco and Plante, Arens, Hartz, Smith and Thompson ABSTRACT: A nonredundant time delay monitor for a control system of the type responsive to system command and followup signals. The monitor provides an alternating signal which switches to a constant level signal for disconnecting the control system from its load for internal monitor failures and for system failures when the difference between the command and followup signals exceeds a predetermined threshold for a specified interval.

REFERENCE SIGNAL GENERATOR 18

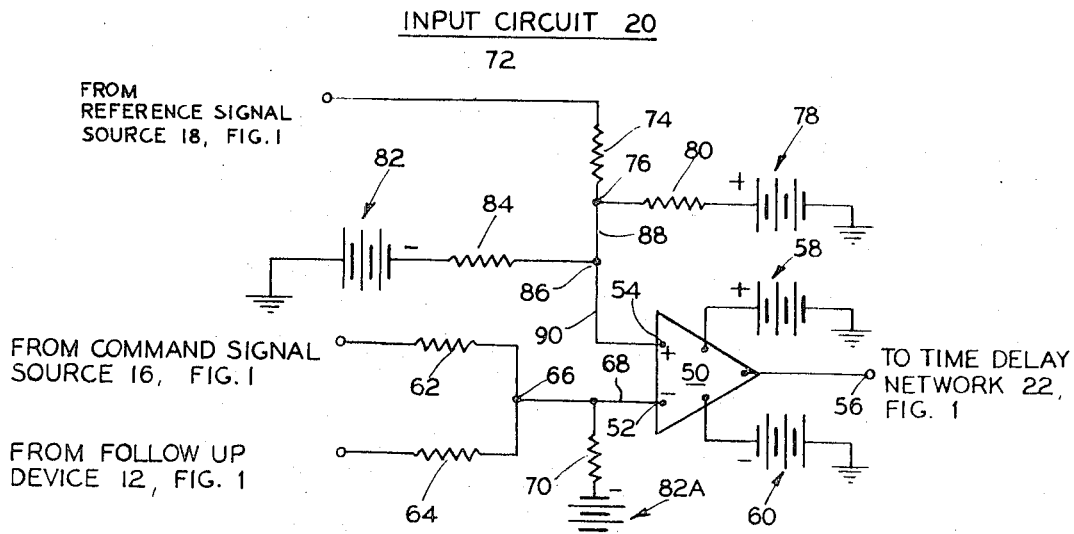
FIG. 3
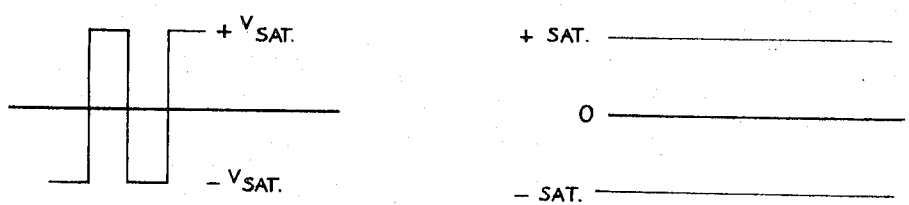
FIG. 3A
FIG. 3B
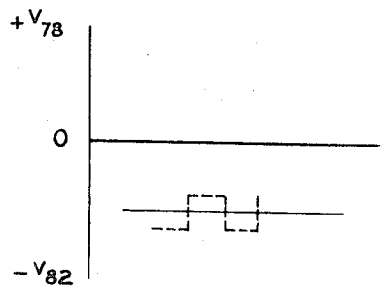
FIG. 3C

TIME DELAY CIRCUIT 22

PATENTED NOV 30 1971 3,624,479

OUTPUT CIRCUIT 24

INVENTOR.
JOHN G. CALLAS
BY
ATTORNEY 3,624,479

FAIL INACTIVE, NONREDUNDANT TIME DELAY MONITOR

BACKGROUND OF THE INVENTION

1. Field of the Invention

This invention relates to monitors for control systems. More particularly, the invention relates to nonredundant time delay control system monitors which disconnect the system from its load for internal monitor failures as well as for control system failures.

2. Description of the Prior Art

Servocontrol systems for aircraft require monitors for detecting the difference between servo command and followup signals and for disconnecting the servosystem from an aircraft control surface when the difference exceeds a specified threshold for a specified interval. Ideal monitors disconnect the system for internal monitor failures as well as for control system failures and in this sense the monitor is fail inactive. The aforenoted requirements must be satisfied with minimum ground or inflight stimuli to test the monitor. These combined features prohibit the use of time delay monitors now known in the art.

SUMMARY OF THE INVENTION

This invention contemplates a monitor for a control system and includes means for providing an alternating reference signal and an input circuit for comparing the difference between control system command and followup signals to the alternating reference signal. When the differential exceeds a predetermined threshold, the signal provided by the input circuit changes from an alternating signal to a steady state signal. A time delay circuit senses loss of the alternating signal and provides a signal which decays during an interval from an initial level in one sense to some final level in the opposite sense. During said decay the signal from the time delay circuit crosses a level in the one sense close to 0 volts which is coincident with the minimum excursion of the reference signal, and at which point an output circuit is affected by said signal to provide a constant level signal. The several circuits are arranged so that any component failure also results in the output amplifier providing the constant level signal, and which constant level signal is effective for disconnecting the control system from its load.

One object of this invention is to provide a time delay monitor for a control system, and which monitor senses the error between control system command and followup signals and disconnects the control system from its load when the error exceeds a specified threshold for a prescribed interval.

Another object of this invention is to arrange said monitor so that it is fail inactive in that any internal monitor failure disconnects the control system from its load.

Another object of this invention is to provide a monitor of the type described which uses minimum ground and/or inflight stimuli for testing purposes.

Another object of this invention is to provide a single thread, i.e., nonredundant self-monitored time delay monitor for a control system.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE DRAWINGS

FIG. 3 is an electrical schematic diagram of an input circuit included in the invention.

FIGS. 3A, 3B and 3C are graphical representations of output waveforms provided by the input circuit of FIG. 3.

DESCRIPTION OF THE INVENTION

Figure 1:
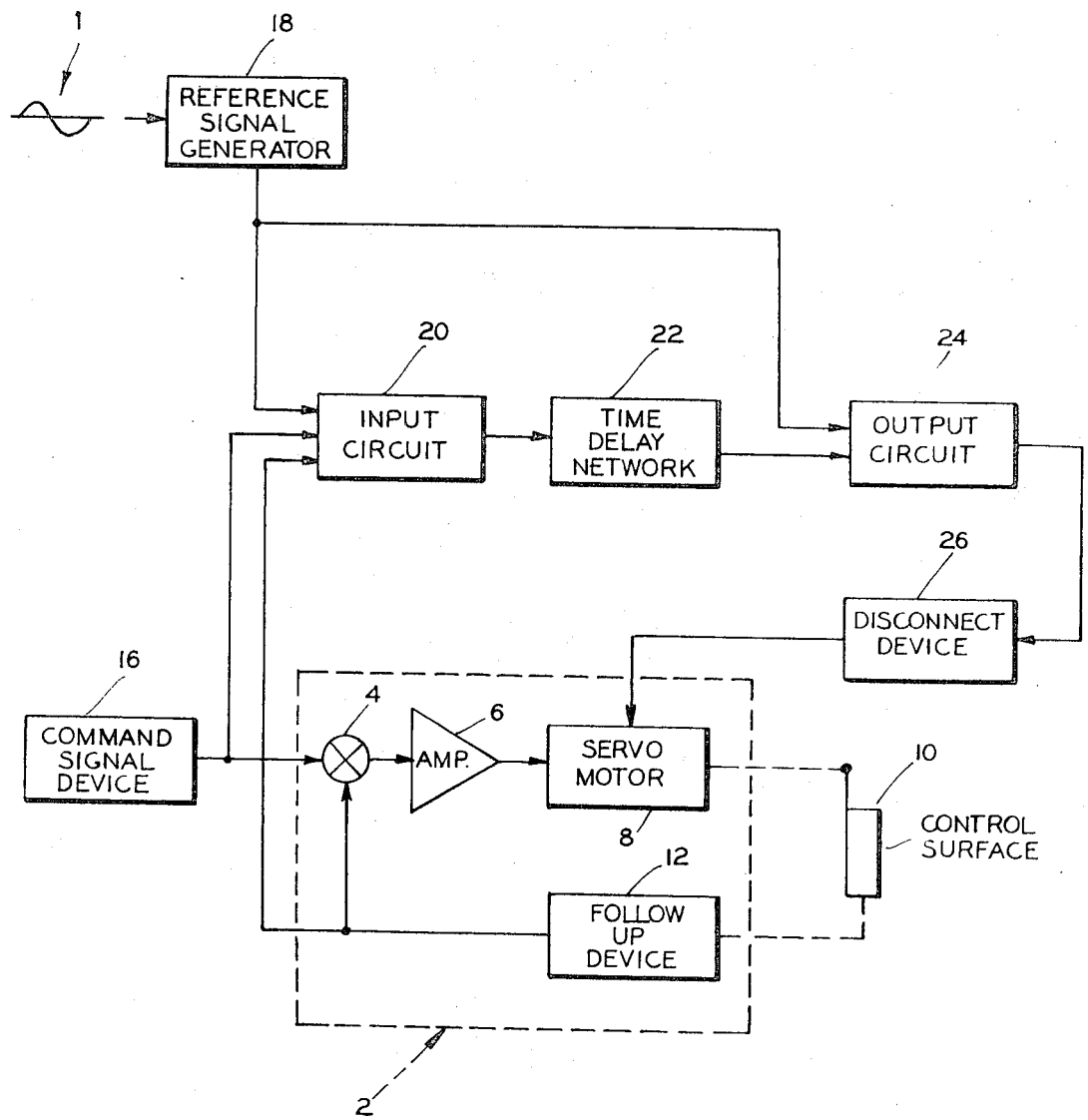
FIG. 1 is a block diagram of a control system and monitor according to the invention.

FIG. 1 shows a conventional type servosystem such as may be used for controlling an aircraft, and which system is designated generally by the numeral 2. Servosystem 2 includes a summing device 4, a servoamplifier 6 connected to the summing device and a servomotor 8 connected to the servoamplifier. Servomotor 8 is connected by suitable mechanical means to a control surface 10 which may be, for purposes of illustration, an aircraft rudder. A followup device or transducer 12 is connected by suitable mechanical means to rudder 10 and provides a signal corresponding to the position of the rudder affected by servomotor 8.

The signal from followup device 12 is applied to summing device 4 and summed thereby with a servo command signal provided by a command signal device 16 which may be a device manually operated by the pilot of the craft to command a selected yaw attitude. Servoamplifier 6 is responsive to the summation signal from summation means 4 for regulating the input to motor 8 whereby motor 8 displaces control surface 10 for affecting the yaw command. When control surface 10 is at the commanded position, the summation signal from summing means 4 is essentially 0.

Figure 2:
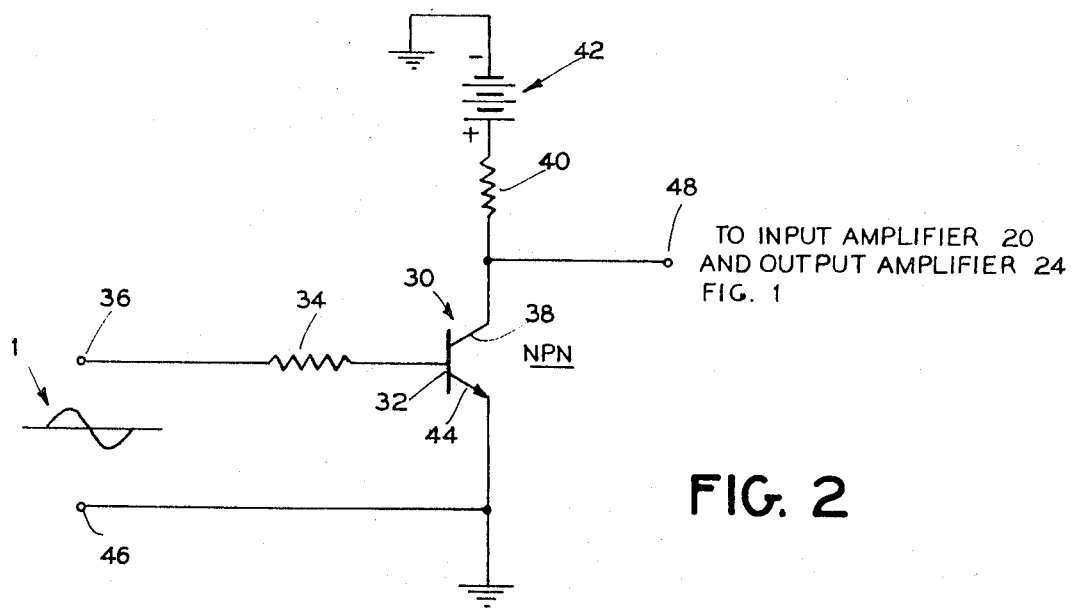
FIG. 2 is an electrical schematic diagram of a reference signal generator included in the invention.
Figure 2A:
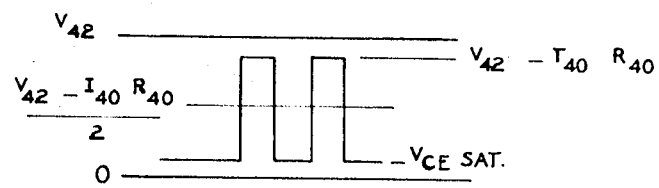
FIG. 2A is a graphical representation of the output waveform provided by the reference signal generator of FIG. 2.

The monitor of the invention includes a reference signal generator 18 which is energized by a suitable AC voltage from a voltage source 1, such as may be available on aircraft, and provides an alternating reference signal having a waveform as shown in FIG. 2A. The alternating reference signal is applied to an input circuit 20. The servocommand signal from command signal device 16 and the servo followup signal from followup device 12 are applied to input circuit 20.

Input circuit 20 compares the difference between the command and followup signals to the alternating reference signal from reference signal source 18. When the command followup differential is below a predetermined threshold, circuit 20 provides an alternating signal having a waveform as shown in FIG. 3A. When this threshold is exceeded, indicating a system failure, circuit 20 changes to a steady state, positive or negative signal as shown in FIG. 3B.

The signal from input circuit 20 is applied to a time delay network 22. When input circuit 20 provides the alternating output (FIG. 3A), time delay circuit 22 provides a steady state signal at some positive level ($V_i$) as shown in FIG. 4A. When input circuit 20 provides the steady state output (FIG 3B) the steady state signal from time delay circuit 22 decays over a predetermined interval from its initial positive level to some final negative level ($-V_f$) as shown in FIG. 4B.

The signal from time delay circuit 22 and the signal from reference signal generator 18 are applied to an output circuit 24. When the signal from time delay circuit 22 is at its initial steady state level $+V_i$ (monitor in the active state), output circuit 24 provides an alternating signal having a waveform as shown in FIG. 5A (Active). As the output from time delay circuit 22 decays from its initial positive level $V_i$ to its final negative level $-V_f$, it crosses, after an interval $T_d$, a positive level close to 0, and which level is coincident with the minimum excursion of the alternating signal provided by reference signal generator 18 (see FIG. 5C). At this point the signal from output circuit 24 changes to a steady state positive level as shown in FIG. 5A (Inactive) and is indicative of a failure condition.

The signal from output circuit 24 is applied to a disconnect device 26, and when the output circuit signal is in a steady state condition the disconnect device provides a signal which is applied to servomotor 8 for rendering the motor ineffective for controlling control surface 10. To this end, servomotor 8 may include a relay arrangement energized by the steady state signal from disconnect device 26 for disconnecting the motor from the control surface.

With reference to FIG. 2, wherein reference signal generator 18 is shown in substantial detail, the alternating signal therefrom (FIG. 2A) is generated by the voltage from AC voltage source 1 driving a switching type NPN-transistor 30. Base element 32 of transistor 30 is connected through a resistor 34 to a reference signal generator input terminal 36. Another input terminal 46 is connected to ground. Transistor 30 has a grounded emitter element 44 and a collector element 38 connected through a resistor 40 to suitable source of positive direct current shown as a battery 42. The output from reference signal generator 18 is taken at an output terminal 48 connected to collector element 38.

The AC excitation applied to base 32 of transistor 30 is of sufficient amplitude to provide the required base drive voltage at a relatively small phase displacement from the zero crossover points of the excitation for generating a reasonably symmetrical square wave signal at output terminal 48.

The square wave signal (FIG. 2A) is a result of the chopping action of transistor 30. When the transistor is conductive, (positive AC excitation) the amplitude of the square wave corresponds to the collector-emitter circuit saturation voltage ($V_{CE\,SAT}$). When the transistor is nonconductive (negative AC excitation) the amplitude is the difference between the level of the voltage from battery 42 and the product of the resistance of resistor 40 and the current therethrough ($V_{42}-I_{40}R_{40}$). Keeping in mind that reference signal generator 18 is connected to input circuit 20 and output circuit 24 (FIG. 1), if the resistance of the input and output circuits is much greater than that of resistor 40, the positive part of the square wave approaches battery voltage ($V_{42}$). It now follows that the maximum excursions of the square wave output at output terminal 48 alternately approach but do not reach voltage ($V_{42}$) and ground (See FIG. 2A).

Failure of components included in reference signal generator 18 cause the alternating signal at output terminal 48 thereof to change to a constant level signal. Thus, if resistor 34 is open, the output signal is at a constant level approaching $V_{42}$ and if resistor 34 is shorted, the AC excitation voltage from voltage source 1 is affected for one-half cycle. This latter condition will be hereinafter more fully explained.

If resistor 40 is open, the output signal is at a constant level which is a function of the load interaction provided by amplifiers 20 and 24 and their respective supply voltages. If resistor 40 is shorted, the output signal is clamped to voltage $V_{42}$.

If either base element 32 or collector element 38 of transistor 30 are open, the output signal is at a constant level approaching $V_{42}$. If emitter 44 is open, or if the base to emitter circuit is shorted, the output signal is also at a constant level approaching $V_{42}$.

If the base to collector circuit is shorted, the output signal clamps to a level near 0 and if the emitter to collector circuit is shorted, the collector voltage clamps to ground.

As shown in FIG. 3, input circuit 20 includes a high-gain amplifier 50 having an inverting input terminal 52, a noninverting input terminal 54 and an output terminal 56 connected to time delay network 22 (FIG. 1). Amplifier 50 is connected to sources of constant positive- and negative-operating voltages shown as a battery 58 and a battery 60, respectively. Input amplifier 50 is arranged with each of the inputs to the amplifier biased so that any input resistor failure offsets the command signal followup signal balance to a degree sufficient to drive the output of amplifier 50 at output terminal 56 to a saturated state (FIG. 3B).

To this end, a conductor from command signal device 16 and a conductor from followup device 12 are connected through resistors 62 and 64, respectively, to a point 66. A conductor 68 leads from point 66 and is coupled through a resistor 70 to inverting input 52 of amplifier 50. Resistor 70 is connected to a suitable source of negative direct current shown as a battery 82A.

An output conductor 72 leading from reference signal source 18 is connected through a resistor 74 to a point 76. A suitable source of positive direct current shown as a battery 78 is connected to point 76 through a resistor 80.

A suitable source of negative direct current shown as a battery 82 is connected through a resistor 84 to a point 86 and is joined thereat by a conductor 88 leading from point 76. A conductor 90 leads from point 86 and is connected to noninverting input terminal 54 of amplifier 50.

In the configuration shown in FIG. 3, input resistors 62 and 64 provide required threshold scaling and offset bias so that when the monitored inputs from command signal source 16 and from followup device 12 differ by a predetermined amount, the signal at output terminal 56 of amplifier 50 thereof changes from an alternating signal to a steady state signal. Resistors 74, 80 and 84 cooperate to provide an input at noninverting input terminal 54 having a peak-to-peak excursion about a nominally offset bias point coincident with the levels by which the monitored signals must differ to cause loss of alternating signal at output terminal 56 (FIG. 3C).

Since the signal from reference signal source 18 is fixed, the polarity of the output at output terminal 56 is dependent on the relative input differential polarity. Thus, as shown in FIG. 3B, the output polarity is negative when the inverting input is shifted from its initially biased point and exceeds the most positive part of the square wave reference and vice versa.

Failure of components included in input circuit 20 causes the alternating signal (FIG. 3A) at output terminal 56 to revert to a steady state signal (FIG. 3B). Thus, if either resistors 62 or 64 are open, the input at inverting input terminal 52 shifts negative and the output signal at output terminal 56 is at positive saturation. If either of the resistors are shorted, the differential signal shifts to its input level and the output signal is at negative saturation.

If resistor 70 is open, the differential voltage is at 0 volts and the output signal is at negative saturation and if the resistor is shorted, the differential voltage clamps to the level of the voltage from battery 82 ($V_{82}$) with the output being at positive saturation.

If resistor 84 is open, the input at noninverting input terminal 54 shifts positive and the output is at positive saturation, and if the resistor is shorted, the noninverting input voltage is clamped to the level of battery 82 ($V_{82}$) and the output signal is at negative saturation.

Likewise, if resistor 80 is open, the noninverting input shifts negative and the output is at negative saturation, and if the resistor is shorted, the noninverting input is clamped to the positive level of battery 78 ($V_{78}$) and the output signal is at positive saturation.

If resistor 74 is open, the reference signal from reference signal source 18 is removed from noninverting input terminal 54 and the output signal is at either positive or negative saturation depending on the relative values of resistors 80 and 84. If resistor 74 is shorted, the voltage at noninverting terminal 54 is driven by the input at conductor 72 which is always positive with respect to the bias at inverting input terminal 52 and the output at output terminal 56 is at positive saturation.

Referring now to amplifier 50, if inverting input terminal 52 is open, the output signal at terminal 56 is at positive saturation. If noninverting input terminal 54 is open, the output signal is at negative saturation. If the connection from battery 58 is open, the output signal is at negative saturation and if the connection from battery 60 is open, the output signal is at positive saturation.

Figure 4:
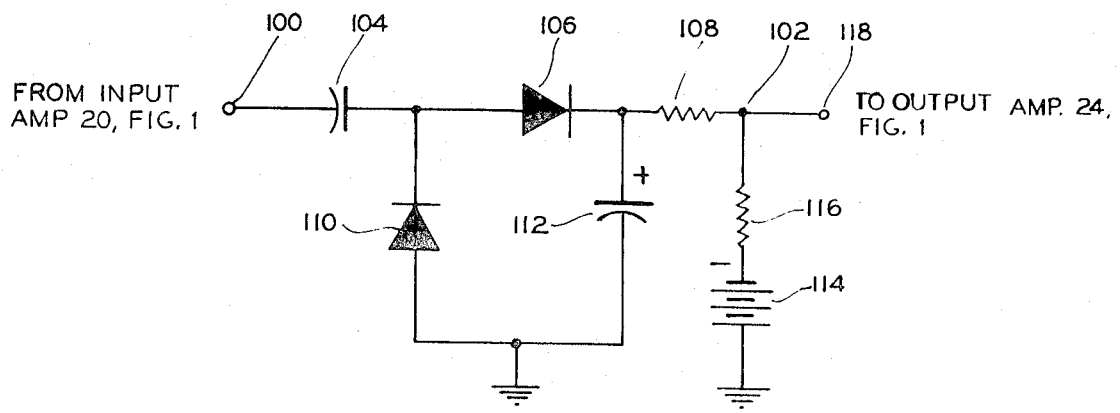
FIG. 4 is an electrical schematic diagram of a time delay circuit included in the invention.
Figure 4A:
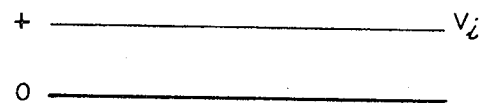
FIGS. 4A and 4B are graphical representations of output waveforms provided by the time delay circuit of FIG. 4.
Figure 4B:
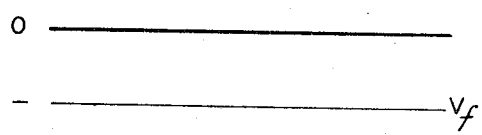

Time delay circuit 22, shown in FIG. 4, includes an input terminal 100 coupled to a summing point 102 through a capacitor 104, a diode 106 and a resistor 108. A diode 110 is connected intermediate capacitor 104 and diode 106, and a capacitor 112 is connected intermediate diode 106 and resistor 108. Diode 110 and capacitor 112 are connected to ground.

A suitable source of negative direct current shown as battery 114 is connected to summing point 102 through a resistor 116. A circuit output terminal 118 is connected to summing point 102.

Time delay network 22 utilizes the alternating signal from input circuit 20 at input terminal 100 and converts said alternating signal via capacitor 104 and diode 106 to a steady state positive signal which is summed at summing point 102 with the negative supply voltage from battery 114 applied through resistor 116. The output at output terminal 118 is initially at some positive level $+V_i$ shown in FIG. 4A. When a failure causes the signal from input circuit 18 to stop alternating and to change to a steady state signal as heretofore described, the output of time delay circuit 24 at output terminal 102 makes a transition toward a final negative value ($V_f$) as shown in FIG. 4B. THe transition time is dependent upon the time constant affected by capacitor 112 and its discharge path through resistors 108 and 116.

Normally, the alternating signal from input circuit 20 at input terminal 100 is restored to a steady state level which clamps the cathode of diode 110 to the negative voltage drop across the diode ($-V_d$) for the negative part of the alternating signal, and to approximately twice the saturation voltage minus the voltage drop across diode 110 ($2V_{SAT}-V_d$) for the positive part of the alternating signal. The values of resistors 108 and 116 are preselected to obtain the desired initial ($V_i$) and final ($V_f$) values for the signal at output terminal 118 of time delay network 22. The value of capacitor 112 is selected to obtain the desired time delay, i.e., the length of time required for the output voltage to decay to 0.

Time delay network 22 is arranged so that the output at output terminal 118 is equal to or greater than the voltage level of battery 114. For the special case of capacitor 112 being open, the phasing relative to the reference signal is carefully selected to insure a failure indication as will be hereinafter described.

In accordance with the above, if capacitor 104 is open or shorted, the output signal is at a constant negative level. Likewise, if diode 110 is open or shorted or diode 16 is open or shorted, the output signal is at a constant negative level. If capacitor 112 is open, an alternating signal will occur (See above) and if the capacitor is shorted, a constant level negative signal will occur.

If resistor 108 is open, the output signal is at a steady state negative level and if the resistor is shorted, the output signal swings positive to the level of the voltage stored by capacitor 112. If resistor 116 is open, the output signal likewise swings positive to the level of the voltage stored by capacitor 112 and if resistor 116 is shorted, the output signal is at the voltage level of battery 114.

Figure 5:
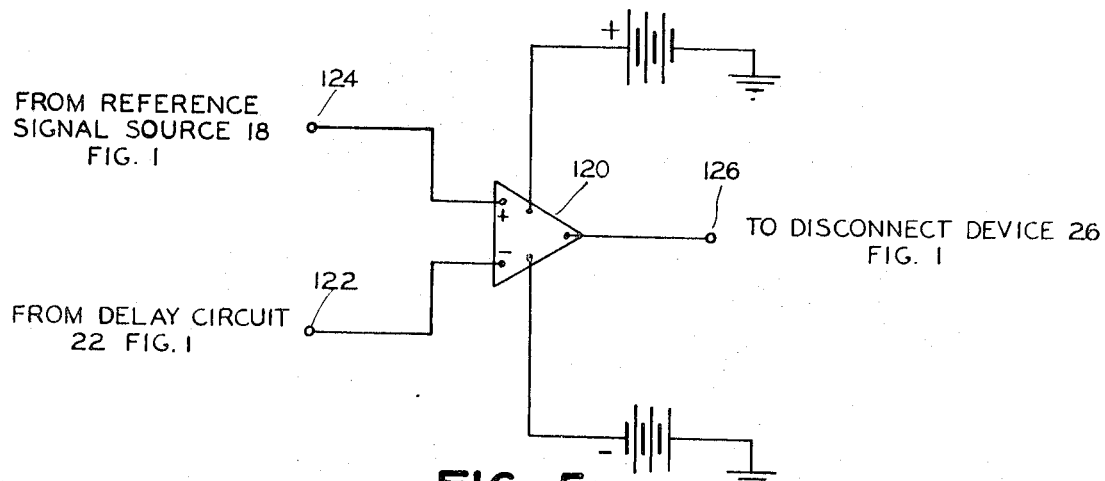
FIG. 5 is an electrical schematic diagram of an output circuit included in the invention.
Figure 5A:
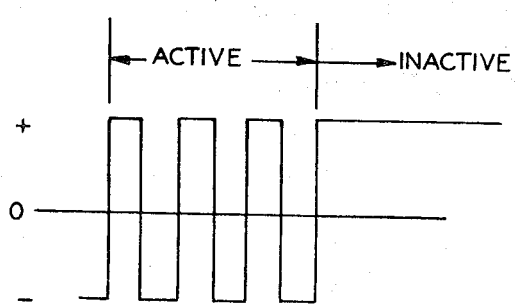
FIG. 5A is a graphical representation of output waveforms provided by the output circuit of FIG. 5 when the monitor is in active and inactive states.
Figure 5B:
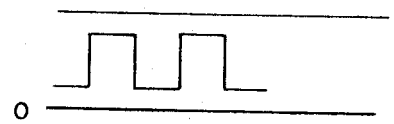
FIGS. 5B and 5C are graphical representations of waveforms at inverting and noninverting input terminals of the output circuit of FIG. 5.
Figure 5C:
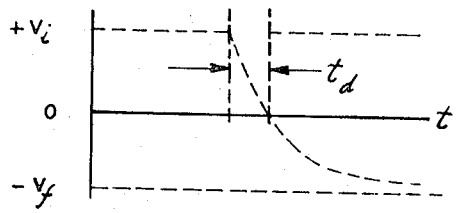

With reference now to FIG. 5, output circuit 24 includes a high-gain amplifier 120 having an inverting input terminal 122 connected to time delay circuit 22 (FIG. 1) and a noninverting input terminal 124 connected to reference signal source 18 (FIG. 1). Amplifier 120 provides, at an output terminal 126, an alternating signal as long as the input signal at inverting input terminal 122 is between the most positive and negative peaks of the reference signal at input terminal 124. IF the signal at noninverting input terminal 122 goes out of this range, the output signal at output terminal 126 will change from an alternating signal (FIG. 5A, Active) to a steady state signal (FIG. 5A, Inactive) for actuating disconnect device 26 (FIG. 1) to disconnect servomotor 8 from control surface 1. When the monitor output is steady state, it is said to be inactive. The monitor will also become inactive if the reference signal at noninverting input terminal 124 stops alternating or does not alternately cross the constant level signal at inverting input terminal 122 at each half-cycle.

The aforenoted description of the invention illustrates the fail inactive features of the monitor, and wherein the monitor output is inactive, i.e., a steady state output for input signal failures as well as for internal monitor failures. There are, however, two cases where circuit failures occur, and which failures do not automatically inactivate the monitor.

The first case is for a shorted resistor 34 included in reference signal generator 18 (FIG. 2) and heretofore referred to. In this instance, if the supply voltage from alternating voltage source 1 has sufficient current capacity, the base emitter junction of transistor 30 eventually fails and in turn induces the inactivation of the output signal at output terminal 48. In other words, the signal at output terminal 48 changes from an alternating signal to a steady state signal. If the above action did not occur, and voltage source 1 was not affected, the basic operation of the monitor would not be affected; that is, the output at output terminal 48 would remain alternating. In this case, the monitor would remain active and retain its failure-detecting capability.

THe second case is for an open failure of capacitor 112 in time delay circuit 24 (FIG. 4) and heretofore referred to. In this instance, the conversion from the active to the inactive state does occur, but as a result of a discrete selection of the relative phasing and magnitudes of the reference input and the unfiltered alternating output resulting from failure of capacitor 112 in the time delay network.

With reference, then, to FIG. 3 wherein the schematic diagram for input circuit 20 is shown, the signal at noninverting input terminal 54 of amplifier 60 is in phase with the alternating input at input terminal 52 resulting from a failure. The reference signal has a positive peak corresponding to the voltage level from battery 42 (FIG. 2) and a negative peak close to 0. At the same time, the positive peak from the failed time delay network is $V_i$ and the negative peak is $V_f$. As a consequence, the signal at noninverting input terminal 54 is always positive with respect to the signal at inverting input terminal 52 during each half-cycle and the output of amplifier 50 is driven to positive saturation and thereby being inactive.

The circuit implementation heretofore described provides for a single thread, i.e., nonredundant, self-monitored time delay monitor. The implementation may be utilized for DC or AC power monitoring, servo loop monitoring and for monitoring signal chain or cross voter comparators. Attention is directed to the feature of the invention wherein internal monitor failures either render the system inactive or do not affect the capability of the system for detecting signal errors or other internal monitor failures.

Although only one embodiment of the invention has been illustrated and described, various changes in the form and relative arrangements of the parts, which will now appear obvious to those skilled in the art may be made without departing from the scope of the invention. REference is, therefore, to be had to the appended claims for a definition of the limits of the invention.

What is claimed is:

1. For a control system of the type including means connected to sources of command and followup signals and responsive to said signals for driving a load, a monitor comprising:

a signal source for providing a reference signal and including an input circuit connected to a source of driving voltage, a biasing circuit connected to a source of biasing voltage and a current flow control circuit connected to the driving voltage source and to the biasing voltage source, and affected by the voltages therefrom for normally providing an alternating signal and for providing a steady state signal when at least one of said input, biasing and current flow control circuits malfunctions;

first means connected to the reference signal source, and to the sources of command and followup signals and responsive to the signals therefrom for providing a monitor signal when the difference between the command and followup signals exceeds for a predetermined interval a threshold determined by the reference signal; and second means connected to the first means and to the control system and responsive to the monitor signal from said first means for rendering the control system ineffective to drive the load.

2. A monitor as described by claim 1, wherein the first means includes:
an input circuit connected to the reference signal source and to the sources of command and followup signals for comparing the signals therefrom and for providing a comparison signal when the difference between the command and followup signals exceeds a threshold determined by the reference signal;
a time delay circuit connected to the input circuit and responsive to the comparison signal for providing a signal which decays from a level in one sense to a level in another sense; and
an output circuit connected to the time delay network and to the reference signal source, and responsive to the decaying signal at the end of the predetermined interval and the reference signal for providing the monitor signal.

3. A monitor as described by claim 2, wherein:
the comparison signal is a steady state signal; and
the input circuit provides an alternating signal when the difference between the command and followup signals is below the threshold determined by the reference signal.

4. A monitor as described by claim 3, wherein:
the time delay circuit is responsive to the alternating signal from the input circuit to provide a steady state signal and is responsive to the steady state signal from said input circuit to provide the delaying signal.

5. A monitor as described by claim 4, wherein:
the reference signal is an alternating signal;
the output circuit is responsive to the alternating reference signal and the steady state signal from the time delay circuit for providing an alternating signal, and is responsive to the alternating reference signal and the decaying signal at the end of the predetermined interval for providing the monitor signal.

6. A monitor as described by claim 4, wherein:
the monitor signal is a steady state signal.

7. A monitor as described by claim 4, wherein:
the steady state signal is in the one sense.

8. A monitor as described by claim 5, wherein:
the decaying signal is at a level coincident with the minimum excursion of the alternating reference signal at the end of the predetermined interval.

9. A monitor as described by claim 2, wherein the input circuit includes:
a first circuit connected to the reference signal source;
a second circuit connected to the command signal source;
a third circuit connected to the followup device; and
an amplifier circuit connected to the first, second and third circuits and affected by the signals applied therethrough for providing the comparison signal when at least one of said first, second, third and amplifier circuits malfunctions.

10. A monitor as described by claim 2, wherein the time delay circuit includes:
a first circuit connected to the input circuit;
a second circuit connected to the first circuit for applying a time delay characteristic to the signal applied therethrough; and
a biasing circuit connected to the second circuit for rendering the time delay circuit effective to provide a signal at a predetermined level when at least one of said first, second and biasing circuits malfunctions.

11. A monitor as described by claim 2, wherein said output circuit includes:
a first circuit connected to the reference signal source;
a second circuit connected to the time delay circuit; and
an amplifier circuit connected to the first and second circuits and responsive to the signals applied therethrough for providing the monitor signal when at least one of said first, second and amplifier circuits malfunctions.

* * * * *